(12) United States Patent
Kage

(10) Patent No.: US 6,885,761 B2
(45) Date of Patent: Apr. 26, 2005

(54) METHOD AND DEVICE FOR GENERATING A PERSON'S PORTRAIT, METHOD AND DEVICE FOR COMMUNICATIONS, AND COMPUTER PRODUCT

(75) Inventor: Hiroshi Kage, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 720 days.

(21) Appl. No.: 09/846,267

(22) Filed: May 2, 2001

(65) Prior Publication Data

US 2002/0070945 A1 Jun. 13, 2002

(30) Foreign Application Priority Data

Dec. 8, 2000 (JP) ........................................ 2000-373937

(51) Int. Cl.⁷ ................................................ G08K 9/00
(52) U.S. Cl. ........................ 382/118; 382/190; 345/581
(58) Field of Search ................................ 382/118, 154, 382/103, 168–172, 164–165, 190, 195, 199, 115; 345/581, 419, 418, 762, 473, 475, 765

(56) References Cited

U.S. PATENT DOCUMENTS

| | | | | |
|---|---|---|---|---|
| 6,072,496 A | * | 6/2000 | Guenter et al. | ............. 345/419 |
| 6,211,903 B1 | * | 4/2001 | Bullister | .................. 348/14.16 |
| 6,301,370 B1 | * | 10/2001 | Steffens et al. | ............. 382/103 |
| 6,437,808 B1 | * | 8/2002 | Brill et al. | ................... 345/765 |
| 6,529,630 B1 | * | 3/2003 | Kinjo | ......................... 382/190 |
| 2004/0047494 A1 | * | 3/2004 | Lee et al. | .................... 382/118 |
| 2004/0105672 A1 | * | 6/2004 | Misumi et al. | ................ 396/2 |

FOREIGN PATENT DOCUMENTS

| | | |
|---|---|---|
| JP | 6-138137 | 5/1994 |
| JP | 9-91429 | 4/1997 |
| JP | 10-255017 | 9/1998 |
| JP | 11-283036 | 10/1999 |
| JP | 2000-293702 | 10/2000 |

OTHER PUBLICATIONS

J. Hu et al.; "Locating head and face boundaries for head-–shoulder images", *Pattern Recognition*, vol. 32, pp. 1317–1333 (1999).

* cited by examiner

*Primary Examiner*—Kanjibhai Patel
*Assistant Examiner*—Ali Bayat
(74) *Attorney, Agent, or Firm*—Leydig, Voit & Mayer, Ltd.

(57) ABSTRACT

A person's portrait generation device includes an image input section which picks up a two-dimensional image containing a person's face, using an image sensor. A head area extracting section extracts the head of the person from the image. A feature detection section detects the position of characteristic feature(s) of the face of that person. A face outline determining section determines a border between a face outline and a background. An image processing section generates a person's portrait in which the characteristic feature(s) of the face is emphasized.

44 Claims, 13 Drawing Sheets

METHOD AND DEVICE FOR GENERATING A PERSON'S PORTRAIT, METHOD AND DEVICE FOR COMMUNICATIONS, AND COMPUTER PRODUCT

FIELD OF THE INVENTION

The present invention relates to a technology for generating an image of a person's portrait in which, from a two-dimensional image containing a person's face picked up by an image sensor, a feature of the subject person is emphasized to generate the person's portrait or generate a deformed image of the person's portrait. This invention also relates to a method and a device for communication, and a computer readable recording medium which stores a computer program which, when executed on a computer realizes, the method according to the present invention.

BACKGROUND OF THE INVENTION

In recent years, it has become possible to send/receive electronic mail not only on a personal computer but also on a portable terminal. Furthermore, not only documents, but also a sender's portrait have been widely attached to the electronic mail. When creating such a portrait by using a conventional method, it is necessary for the user to manually make selections from prepared parts of several tens or more kinds, such as face outline parts, face parts and hairstyles, and combine them all together. In this case, a large number of combinations are available, and, as a result, a great workload is imposed on the user in an attempt to create a desired person's portrait. For this reason, there has been a strong demand for a device which can easily and automatically generate a person's portrait using an image of that person acquired by a camera. In order to create a person's portrait, such a device needs to automatically carry out a sequence of processes of extracting the face portion from the image, detecting eyes, mouth, etc., and replacing the desired parts with already prepared desired templates.

As one example of the related technique, Japanese Laid-Open Patent Application No. 255017/1998 (Tokukaihei 10-255017) discloses a method and device for generating a person's portrait. In this method, with respect to the face area detection, (R, G, B) values of skin color are preliminarily set to a specified range, and pixels having the corresponding color are marked, and clustered so as to carry out the detection, while the face parts detection is carried out by template matching processes. However, with respect to the face area detection, (1) the face color is influenced by illumination conditions, resulting in a difficulty in detecting the face area in some cases;
(2) the face color is not located within the above-mentioned range of the (R, G, B) values due to differences in human races, etc.; and
(3) when pixels having a color similar to the face color exists on the background, it is sometimes difficult to detect the face area.

Moreover, with respect to the face parts position detection, conventional problems are that, (4) when the number of face-part templates is increased so as to match various face parts contained in an image, the amount of calculations increases due to increased collation processes, resulting in degradation in the execution speed; and
(5) a dark shadow tends to appear on the periphery of a face part in an image depending on illumination conditions, resulting in a difficulty in the template matching.

SUMMARY OF THE INVENTION

It is an object of this invention to provide a person's portrait generation device which picks up a two-dimensional image that contains the person's face by using an image sensor, analyzes characteristics features in the face from the picked image, and automatically generates an image in which characteristics features of the face are emphasized. It is another object of this invention to provide a person's portrait generation method for such a device. It is still another object of this invention to provide a communication terminal which incorporates the person's portrait generation device according to this invention, and provide a communication method thereof. It is still another object of this invention a computer readable recording medium which stores a computer program which when executed on a computer realizes the methods according to the present invention.

According to one aspect of this invention, two-dimensional images containing a person's face are picked, area corresponding to head of the person is extracted based on a differential image of the acquired two-dimensional images. After that, position of characteristic features of the face of that person are detected from the area corresponding to head of the person. Then, outline of the face is detected by detecting a border between the face and the background of the image. Finally, the person's portrait in which the characteristics features of the person's face are emphasized is generated based upon the acquired two-dimensional images and data corresponding to the area corresponding to head, position of characteristic features of the face, and the outline of the face.

According to another aspect of this invention, a two-dimensional image containing a person's face is picked, area corresponding to head of the person is extracted from the acquired two-dimensional image. After that, position of characteristic features of the face of that person are detected by dividing the head area thus extracted into face part areas for respective face parts and finding projection data of binarized images for the respective face parts areas. Then, outline of the face is detected by detecting a border between the face and the background of the image. Finally, the person's portrait in which the characteristics features of the person's face are emphasized is generated based upon the acquired two-dimensional image and data corresponding to the area corresponding to head, position of characteristic features of the face, and the outline of the face.

According to still another aspect of this invention, a two-dimensional image containing a person's face is picked, and area corresponding to head of the person is extracted from the acquired two-dimensional image. After that, position of characteristic features of the face of that person are detected from the area corresponding to head of the person. Then, outline of the face is detected by detecting a border between the face and the background of the image. Finally, the person's portrait in which the characteristics features of the person's face are emphasized is generated based upon the acquired two-dimensional image and data corresponding to the area corresponding to head, position of characteristic features of the face, and the outline of the face.

According to still another aspect of this invention, a two-dimensional image containing a person's face is picked, and area corresponding to head of the person is extracted from the acquired two-dimensional image. After that, position of characteristic features of the face for each of the face parts of that person are detected from the area corresponding to head of the person. Then, outline of the face is detected by detecting a border between the face and the background of the image. Finally, the person's portrait in which the characteristics features of the person's face are emphasized by changing the two-dimensional image with respect to each of the face parts.

Furthermore, a communication method and device according to still another aspect of this invention is capable of electronically transmitting or receiving the generated portrait using a communication unit. The communication device is, for, example, a cellular telephone or a PDA.

Furthermore, a computer readable recording medium according to still another aspect of the present invention stores a computer program which when executed realizes the methods according to the present invention.

Other objects and features of this invention will become apparent from the following description with reference to the accompanying drawings.

DESCRIPTION OF THE PREFERRED EMBODIMENTS

Figure 1:
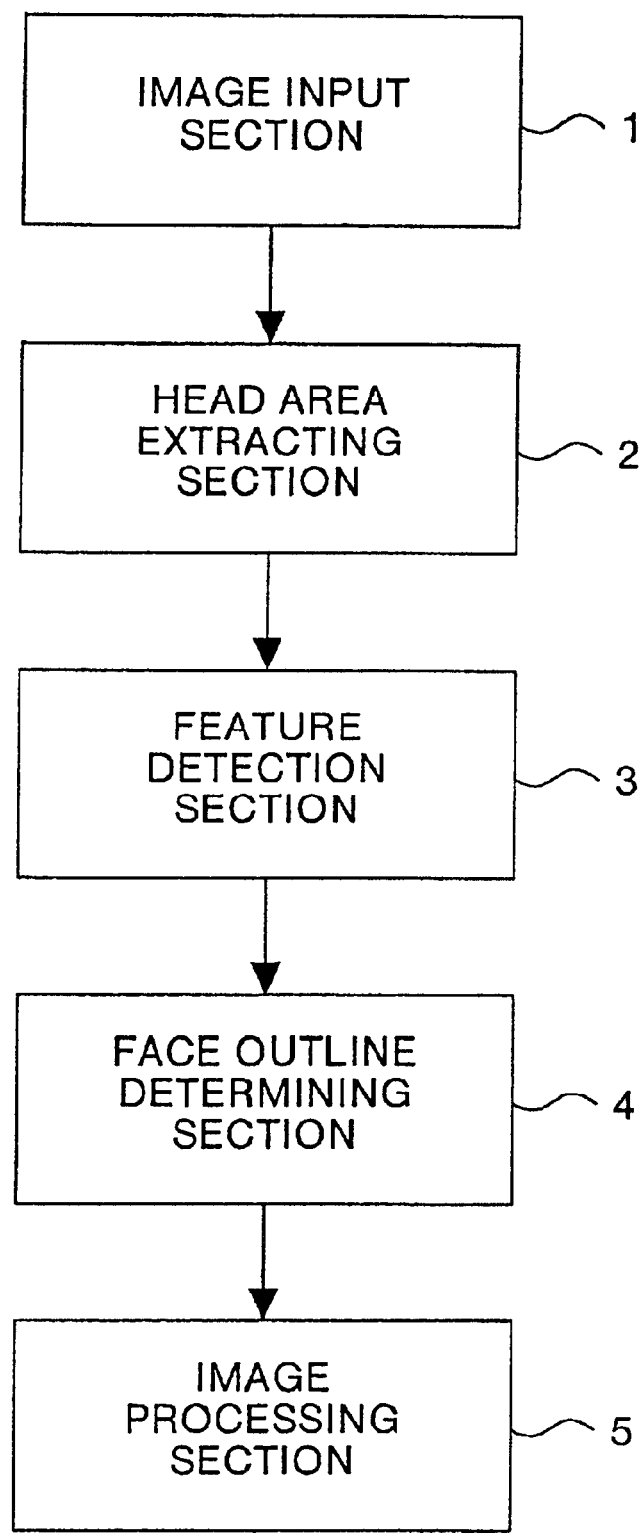
FIG. 1 is a block diagram that shows an arrangement of a person's portrait generation device in accordance with the first embodiment of the present invention.

A first embodiment of the present invention will be explained first with reference to the accompanying drawings. FIG. 1 is a block diagram that shows a construction of an image generation device in accordance with the first embodiment of the present invention. This device comprises five sections. That is, an image input section 1, a head area extracting section 2, a feature detection section 3, a face outline determining section 4 and an image processing section 5.

For convenience of explanation, it will be assumed here that only one person is present in an image that has been picked up by an image sensor, and that although there is change in the position of the person there is no movement in the background of the image.

The image input section 1 including an image sensor picks up two-dimensional images. The head area extracting section 2 analyzes a plurality of the two-dimensional images picked up by the image input section so that an area including the head of a person is extracted. The feature detection section 3 analyzes the luminance values of the input images with respect to the area extracted by the head are a extracting section 2 so that the positions of face parts such as the eyes and mouth are detected. Based upon the face parts positions detected by the feature detection section 3, the face outline determining section 4 analyzes the color of a specific target area, such as the face color of the person, and based upon this analysis, determines the border between the target area and the background. Based upon output information from the head area extracting section 2, the feature detection section 3 and the face outline determining section 4, the image processing section 5 creates an image in which the characteristic features of the target area is emphasized from the input images.

Referring to FIG. 2A to FIG. 2K, a detailed explanation will be given of the operation of the head area extracting section 2. In the first embodiment of the present invention, the head area extracting section 2 calculates a differential image by using two images that have time-wise differences among the input images picked up by the image input section. In this case, in general, it is preferable to use two images that virtually continue in terms of time. Moreover, in the differential image, pixel data are constituted by values obtained by binarizing the absolute value of a difference between corresponding pixel values.

Figure 2A:
FIG. 2 is an explanatory drawing that shows the operation of a head area extracting section in accordance with the first embodiment of the present invention.
Figure 2B:
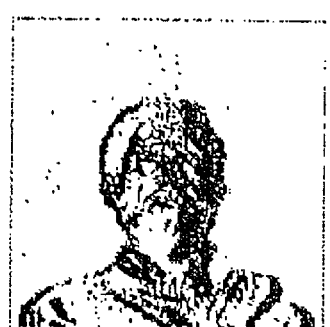

FIG. 2A to FIG. 2K are explanatory draws that show how the head area of a person is detected by using the differential image calculated from the images picked up by the image input section 1. FIG. 2A shows an image including the head of a person picked up by the image input section 1. FIG. 2B is a differential image that has been binarized. In other words, a black pixel indicates a pixel in which there is any change in the pixel value, that is, a pixel that has been moved. In this example, only one person moves; however, black pixels are sparsely mixed into the background due to noise contained in the image. Moreover, when any moving object is contained in the background, black pixels are also mixed into the background portion; however, these black pixels are processed as noise when the main portion of the image is occupied by one person.

Figure 2C:
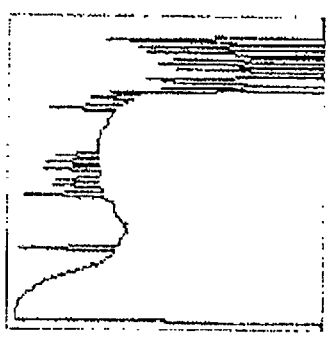
Figure 2D:
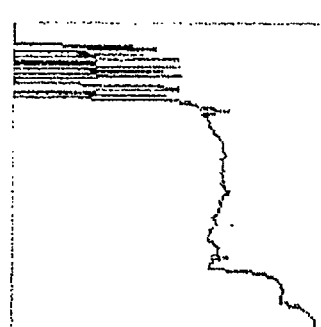

Next, from FIG. 2B, black pixels are retrieved in the horizontal direction of the image. In other words, with respect to black pixels that are aligned along one horizontal line, the position of a black pixel is retrieved rightwards from the left end, or leftwards from the right end, and the position of the black pixel that has been first encountered is recorded. This process is repeated with respect to all the horizontal lines. FIG. 2C shows the results (hereinafter, referred to as left side profile) of the retrieval rightwards from the left end in which the positions of the black pixels that have been first encountered are connected from the upper end to the lower end. FIG. 2D shows the results (hereinafter, referred to as right side profile) of the retrieval leftwards from the right end obtained in the same manner with respect to the positions of the black pixels.

As can be seen in these cases, each of the two profiles has an irregular edge shape due to the black pixels that are noise components sparsely contained in the background. Therefore, prior to obtaining the outline of the head area, it is necessary to eliminate the irregular edge shape that forms noise components.

In order to eliminate this irregular shape, a filtering process is preferably carried out. For example, a median filter in which the horizontal position in the right and left profile is represented as a length value from the end is applied so as to eliminate the noise components.

Figure 3:
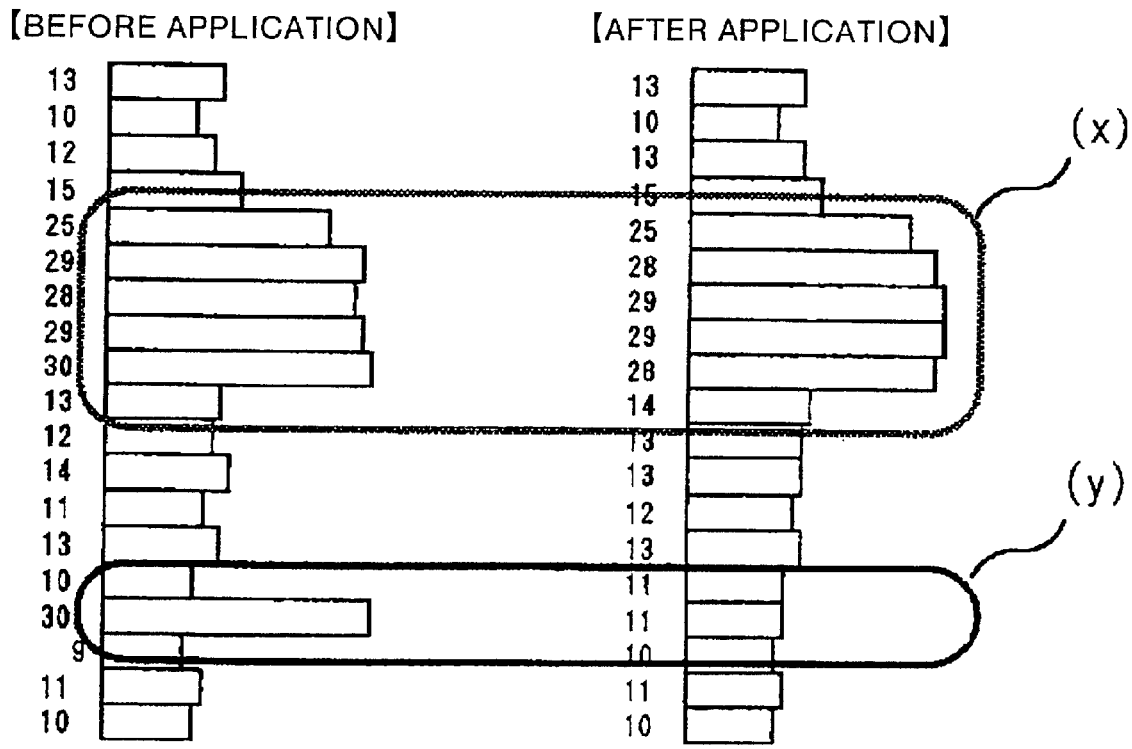
FIG. 3 is an explanatory drawing that shows a median filter in accordance with the first embodiment of the present invention.

Referring to FIG. 3, a brief explanation will be given of the median filter (center value filter).

In the median filter, in general, n-number of data d[0], ..., d[n-1] are sorted in the order to sizes, and d[k](0≦k≦n-1), which is located in the middle in the order to sizes, is selected as an output value.

In FIG. 3, for example, with respect to N-number of column data d(1) to d(N), with respect to arbitrary data d(k), a total of (2m+1) number of data including m-number of proximity data before and after thereof are sorted in the order to sizes, and d(k) is replaced by a value located in just the middle number (m+1); thus, the filtering process is realized. In this manner, the slope of data (contrast) is properly maintained. In other words, as shown in FIG. 3, when high values are continuously inputted as in the case of an (x) data group (from the fifth data to the tenth data from the top) before the application of the process, the contrast (gaps between the values) is appropriately maintained as shown in the Figure indicating a state after the application of the process.

In contrast, even when a high value is singly inputted as in the case of a (y) data group (from the fifth data from the bottom to the third data from the bottom) before the application of the process, this is eliminated by taking the center value of the proximity data as shown in the Figure indicating a state after the application of the process, thereby making it possible to eliminate the noise.

Figure 2I:
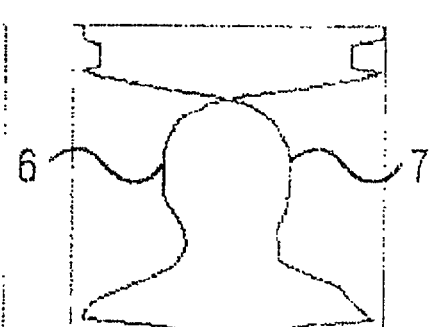
Figure 2E:
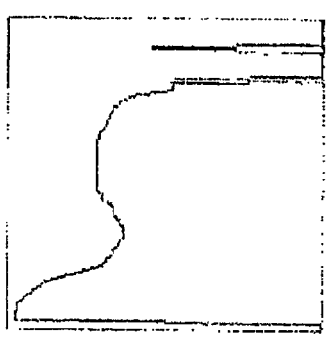
Figure 2F:
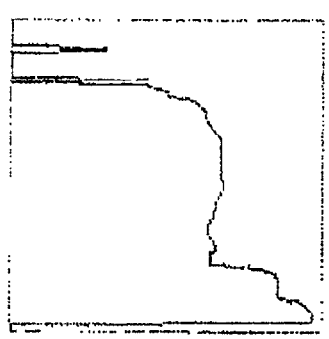

FIG. 2E and FIG. 2F respectively show the results obtained by applying the median filter to the profiles of FIG. 2C and FIG. 2D. However, as shown by the results of FIG. 2E and FIG. 2F, even the application of the median filter sometimes can not eliminate all the noise components depending on the degree of noise mixture. Therefore, the application of a smoothing filter to FIG. 2E and FIG. 2F makes it possible to further eliminate the noise components.

In the smoothing filter, in general, supposing that n-number of data d[0], ..., d[n-1] exist, for example, with respect to arbitrary profile data d[k], (d[k-1]+d[k]+d[k+1])/3 is calculated, and the average value is outputted as d[k].

Figure 4:
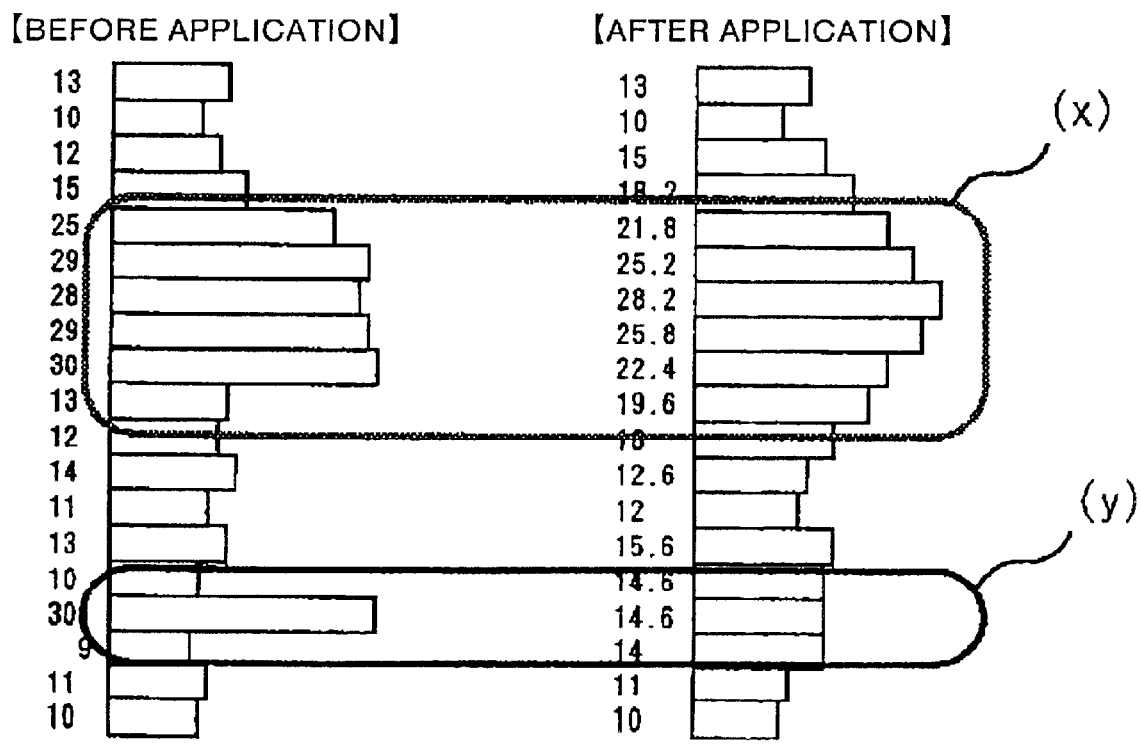
FIG. 4 is an explanatory drawing that shows a smoothing filter in accordance with the first embodiment of the present invention.

Referring to FIG. 4, a brief explanation will be given of the smoothing filter.

In FIG. 4, for example, -in connection with N-number of column data d (1) to d (N), with respect to arbitrary data d(k), an average value of a total of (2m+1) number of data including m-number of proximity data before and after thereof are calculated to find an average value, and d(k) is replaced by this value; thus, the filtering process is realized. In this manner, the data can be smoothed by using comparatively less amount of calculations. In other words, as shown in FIG. 4, when high values are continuously inputted as in the case of an (x) data group (from the fifth data to the tenth data from the top) before the application of the process, a smoothing process is available as a whole although the contrast becomes slightly dull as shown in the Figure indicating a state after the application of the process.

Moreover, even when a high value is singly inputted as in the case of a (y) data group (from the fifth data from the bottom to the third data from the bottom) before the application of the process, noise is clearly eliminated as shown in the Figure indicating a state after the application of the process.

Figure 2J:
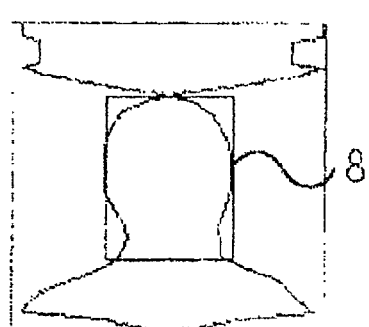
Figure 2G:
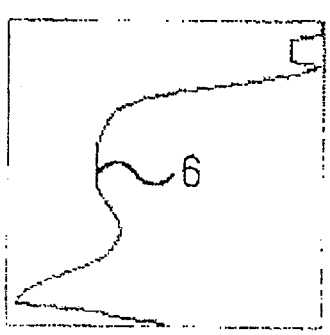
Figure 2H:
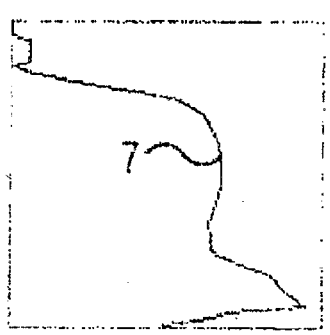

FIG. 2G and FIG. 2H show the results of smoothing processes carried out on the right and left profiles of FIG. 2E and FIG. 2F. These show that noise components are virtually eliminated so that the right and left outlines of the head are obtained.

Next, an explanation will be given of a method in which a rectangular area enclosing the head area (hereinafter, referred to as a head rectangular shape) is determined by utilizing the right and left profiles shown in FIG. 2G and FIG. 2H.

FIG. 2I shows a state in which left side profile 6 of FIG. 2G and right side profile 7 of FIG. 2H are superposed. Here, in FIG. 2I, retrieval is carried out downward, starting from the upper end of the horizontal line, with respect to the right and left profiles so as to find the first crossing portion, and a horizontal line passing through the first crossing portion is defined as the upper side of the head rectangular shape 8. Next, in order to determine the left side of the head rectangular shape 8, the retrieval is further continued downward with respect to the left side profile 6. A pixel position at which the distance from the right end of the image first starts to decrease is recorded, and a vertical line passing through this point is defined as the left side of the head rectangular shape 8, and recorded. With respect to the right side profile 7, the retrieval is made in the same manner so that a vertical line passing through the resulting pixel position is defined as the right side of the head rectangular shape 8, and recorded.

With respect to the remaining lower side of the head rectangular shape 8, a candidate position is determined by utilizing the fact that the ratio of the width and the height of the head rectangular shape 8 of a general person is virtually constant. More specifically, supposing that the width is W, the height is H and the constant representing the average ratio is k, H/W=k is obtained. Here, the value of W is given by the distances of the right side and left side of the head rectangular shape 8 that have already been determined, and the position (the distance from the upper end of the image) p of the upper side has already been determined; therefore, supposing that the candidate position of the lower side to be found is p', p' (the distance from the upper end of the image) is calculated by the following expression:

$$p' = k \times W + p.$$

Figure 2K:
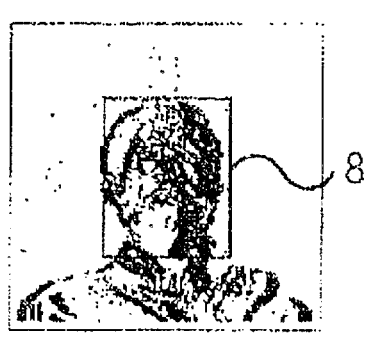

FIG. 2J shows a state in which the head rectangular shape 8 thus determined from the right and left profiles is displayed in a superposed manner. Finally, the head rectangular shape 8 is determined as a silhouette of a person to which movements of the person are reflected as shown in FIG. 2K that is obtained in a manner so as to enclose the head.

Next, an explanation will be given of the operation of the feature detection section 3. FIG. 5A to FIG. 5E is a drawing that explains an example in which luminance values of an input image within the head rectangular shape 8 are analyzed so that the positions of characteristic features of the eyes, nose, mouth, etc. are specified.

Figure 5A:
FIG. 5 is an explanatory drawing that shows the operation of a feature detection section in accordance with the first embodiment of the present invention.
Figure 5B:
Figure 5C:
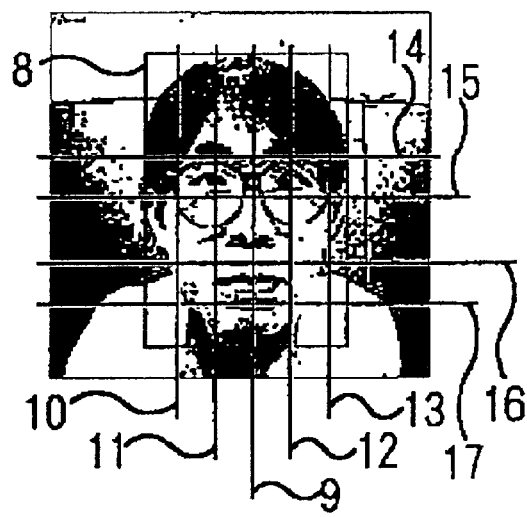

FIG. 5A shows an example of an input image. FIG. 5B shows a state in which the head rectangular shape 8 extracted by the head area extracting section 2 is displayed in a superposed manner. FIG. 5C shows areas 9 to 17 used for specifying rectangular areas that are analyzing ranges for identifying the positions of respective face parts that form characteristic features, and these areas are obtained by preliminarily finding relative positions of the respective face parts with respect to the head shape of a general person.

In other words, with respect to the upper, lower, right and left sides of each of the rectangular shape areas, the right eye is specified by points 14, 15, 10 and 9, the right eye is specified by points 14, 15, 9 and 13, the nose is specified by 15, 16, 11 and 12, and the mouth is specified by 16, 17, 11 and 12.

Figure 5D:
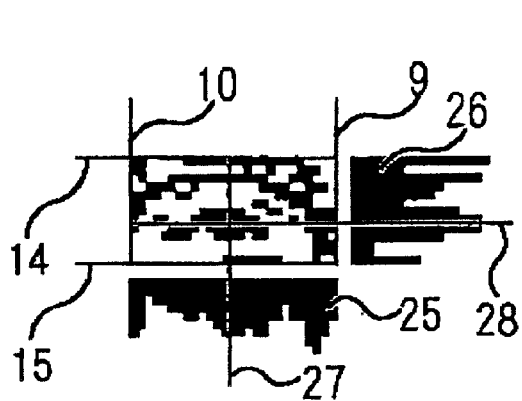

Next, among the face parts detections by the use of FIG. 5D, for example, an explanation will be given of a method by which the position of the right eye is detected. The detection area surrounded by 14, 15, 9 and 10 is obtained by binarizing pixel values of the input image, and with respect to the pixel values, values greater than a threshold value are represented by 0 (while pixels) and values other than this case are represented by 1 (black pixels). In order to calculate the detection position (the center of the pupil) of the right eye by using the center-of-gravity position, projection data are obtained by adding values of respective pixels in the binarized image within the detection area for each row and each column, and the center-of-gravity position of each of these is calculated so that the horizontal position and vertical position of the right eye detection position are obtained. In these cases, 25 and 26 respectively represent projection data in the vertical direction (for each column) and projection data in the horizontal direction (for each row). The center-of-gravity positions are calculated from these projection data. In the horizontal direction, 27 is obtained as the center-of-gravity position, and in the vertical direction, 28 is obtained as such, with the result that the right-eye detection position 19 shown in FIG. 5E is obtained.

Here, with respect to the horizontal and vertical positions, the positions, each providing the maximum value of the projection data, may be used instead of the center-of-gravity of the projection data so as to calculate these positions.

Figure 5E:

In the same manner, the detection position 18, 20 or 21 shown in FIG. 5E for each of the left eye, nose and mouth is found by calculating the center of gravity from the binarized image within each of the rectangular shape areas.

The above explanation has been given of the eyes, nose and mouth serving as the characteristic features; however, in an attempt to improve the precision as a person's portrait, the detecting process may be carried out on other parts elements, such as the eyebrows, front hairstyle, cheeks and ears.

Next, referring to FIG. 6A to FIG. 6G, an explanation will be given of the operation of the face outline determining section 4. In the present embodiment, the face outline determining section 4 calculates the RGB value of the average color of pixels in the proximity of each face parts position by using information of the face parts position detected by the head feature detection section 3 based upon the input image of the image input section 1, and converts this value to a value on the HSV color system; thus, the RGB values of all the pixels of the input image are converted to the HSV values, and these values are plotted on the HSV color system. At this time, an area centered on the HSV value of the average color is set on the HSV color system map, and the pixel data located within the area is again returned to the RGB color system, and plotted on the original input image. Based upon the results of these processes, the face area is estimated.

Figure 6A:
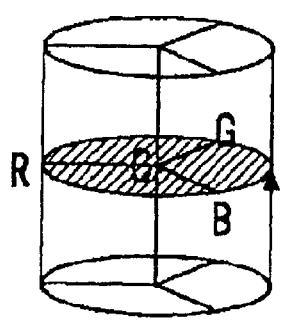
FIG. 6 is an explanatory drawing that shows the operation of a f ace outline determining section in accordance with the first embodiment of the present invention.

In this case, with respect to the conversion of the color system from the RGB values to the HSV values, for example, a method disclosed in U.S. Pat. No. 5586197 is used so as to realize the conversion. Here, the RGB color system uses a cubic shape having R, G, B as its axes, while the HSV color system uses a cylinder shape as shown in FIG. 6A. With respect to the HSV values, the value V (luminance) is represented by the height from the bottom of the cylinder serving as the reference as shown in FIG. 1A, the value S (the degree of saturation, the density of color) is represented by the distance from the center axis C of the cylinder as shown in FIG. 6B, and H (the degree of chrominance, the kind of color) is represented by an angle from a line CR of a mapped red color with the values of G and B of the RGB values being set to 0 on a disc that is a cross-section of the cylinder.

Figure 6B:
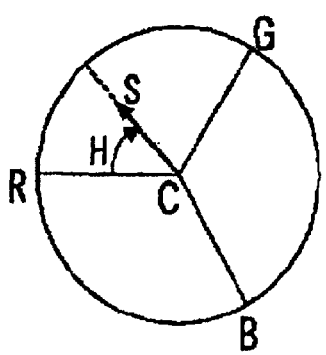
Figure 6C:
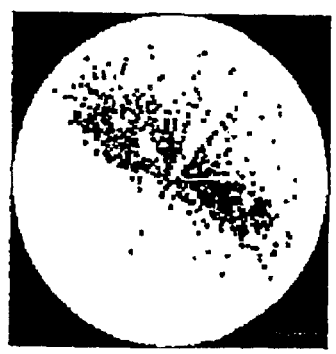

FIG. 6C shows an example in which upon conversion of the RGB values of an input image into HSV values, these values are plotted on the disc shown in FIG. 6B with differences in the value of V being ignored.

Figure 6D:
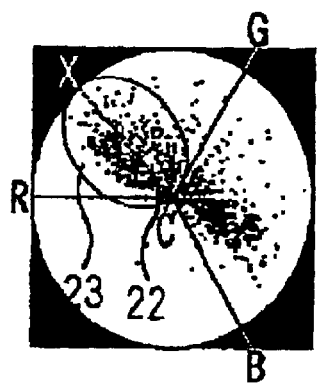
Figure 6E:
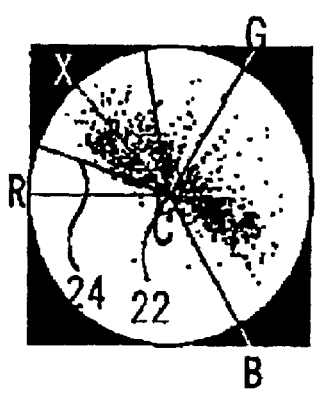

Next, an explanation will be given of a system in which an area is provided on the HSV color system based upon the average color in the vicinity of the face parts position and the face area is specified based upon the color within the area. FIG. 6D and FIG. 6E show color judgment areas for extracting the face area, and 22 represents a position obtained when the average color (RGB value) in the vicinity of the face parts position is converted into an HSV value. As shown in FIG. 6D, the shape of the color judgment area may be set as an elliptical shape area 23 with a line CX serving as a major axis, when a crossing point of the circumference and the extended line of the line connecting the average color position 22 and the center C is set as X, or as shown in FIG. 6E, a delta shape area 24 may be set. In either of the cases, pixels within the area including the average color position 22 and having colors similar to this can be specified as face area candidates.

An explanation will be given of a system in which, by analyzing the positions of the pixels serving as face are a candidates that have been determined as described above, the face outline, especially, the border line in the vicinity of the jaw, is estimated. The determining process of the face outline in the vicinity of the jaw is important in creating a person's portrait. In other words, the case in which the right and left smoothed profiles 6 and 7 are simply used as the face outline in the vicinity of the jaw fails to provide a person's portrait sufficiently representing the characteristic features of the face, and in order to obtain a superior person's portrait, it is necessary to individually determine the face outlines in the vicinity of the jaw.

Figure 6F:
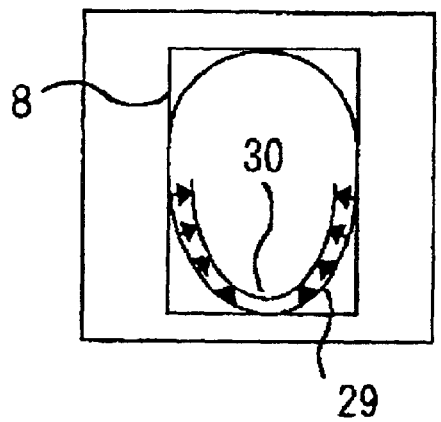

First, with respect to a head outline 29 shown in FIG. 6F, the inside of the head rectangular shape 8 is analyzed by the above-mentioned specifying method of the face area by using the differential image used in the area extracting section 2, partial elliptical shapes of four corners are calculated and set in a manner so as to surround this specified face portion, and one portion of each of the right and left sides of the head rectangular shape 8 is further added to the partial elliptical shape so that the outline of the face including a jaw border line 30 is formed.

Figure 6G:

More specifically, on the lower side surrounded by the right and left side of the head rectangular shape 8, that is, within the semi-elliptical area of the head outline 29, the rate of the face area candidate pixels, explained before, is calculated. In this case, the semi-elliptical shapes of the head outline 29 are contracted toward the respective centers at the same curvature until the calculated rate has exceeded a predetermined threshold value, thereby determining the jaw-border line 30. FIG. 6G shows an example of the estimated results of the jaw border line 30 obtained by applying the above-mentioned technique to an actual image.

Figure 7:
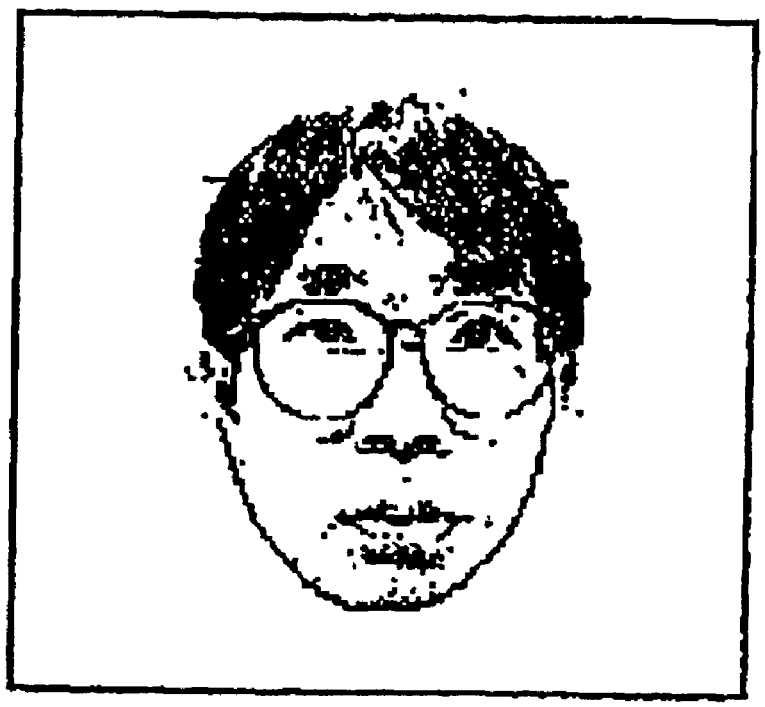
FIG. 7 is a drawing that shows a specific example for a face portrait image that is formed based upon an input image by an image processing section in accordance with the first embodiment of the present invention.

Lastly, an explanation will be given of the operation of the image processing section 5. In the first embodiment, the image processing section 5 generates a person's portrait of a face image contained in an original image by using the head rectangular shape 8 detected by the head area extracting section 2, the positions of the eyes 18, 19 and the mouth position 21 detected by the feature detection section 3, the head outline 29 detected by the face outline determining section 4 and the estimated jaw border line 30. FIG. 7 shows an example of a person's portrait image generated by the image processing section 5. In this image, the upper half of the head outline 29 and the portion surrounded by the jaw border line 30 there of are extracted from the input image to form a face image, and after having been subjected to an edge-emphasizing process, this is binarized to form a line image. At this time, the inside of the face area may be painted using the average color to which the face color calculated by the face outline determining section 4 is reflected; thus, it is possible to obtain the person's portrait image as a color image.

The above-mentioned description has discussed the construction of the person's portrait generation device, and the following description will briefly discuss the person's portrait generation method by reference to a flow chart that summarizes its sequences of processes.

Figure 8:
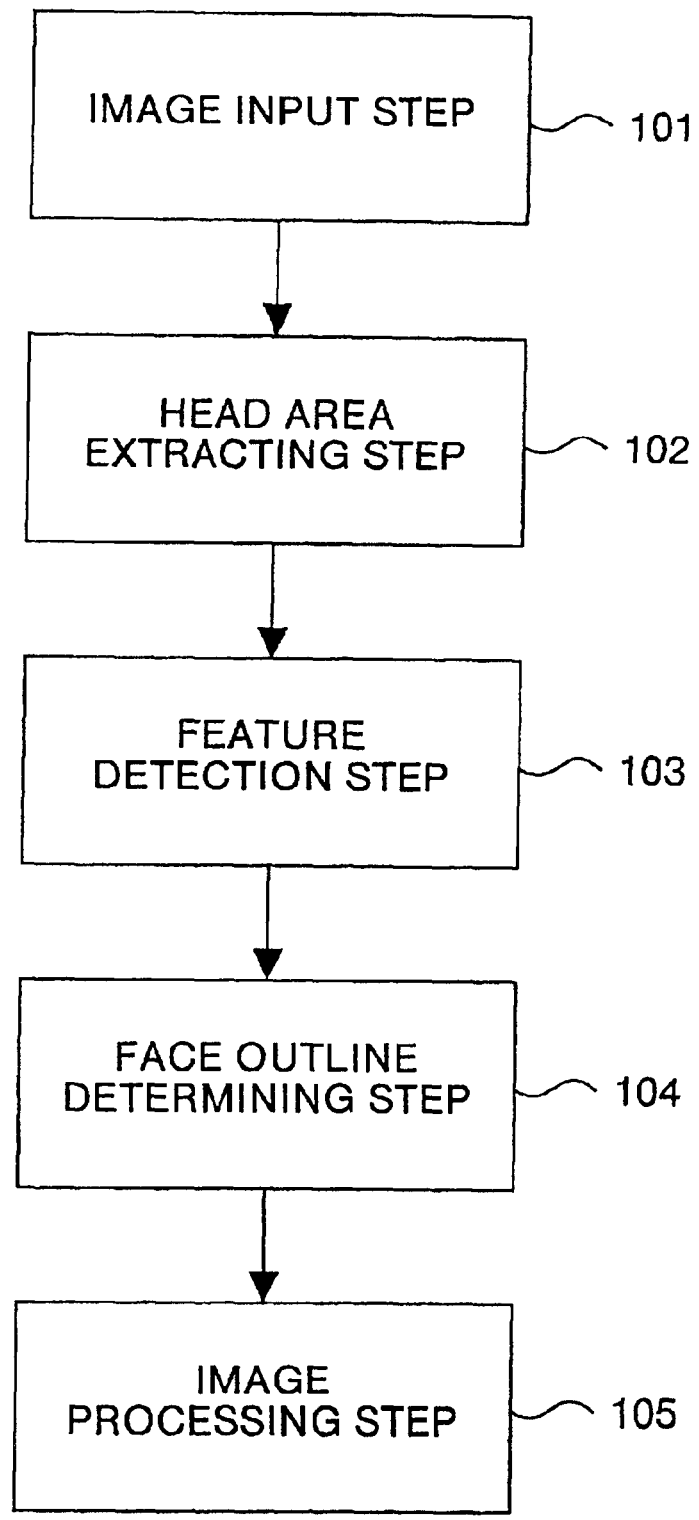
FIG. 8 is a flow chart indicating the steps in a person's portrait generation method in accordance with the first embodiment of the present invention.

FIG. 8 is a flow chart that shows the person's portrait generation method of the present invention corresponding to FIG. 1. Steps 101 to 105 shown in this diagram are performed respectively by the sections 1 to 5 shown in FIG. 1. It is to be noted that the sequence of steps 103 and 104 may be reversed.

FIG. 9 to FIG. 12 are flow charts showing detail processing in the steps 101 to 104 shown in FIG. 8.

Figure 9:
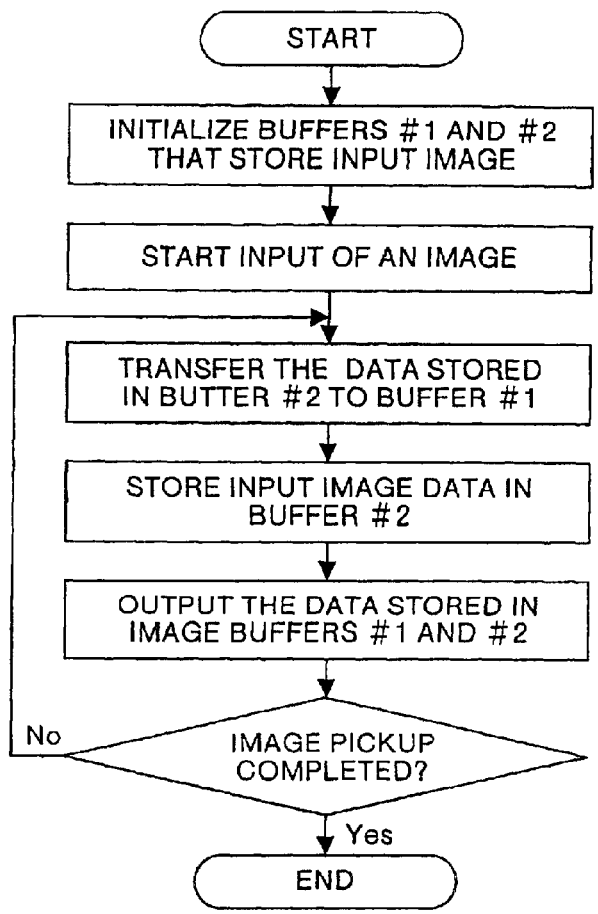
FIG. 9 is a flow chart indicating an image input step in accordance with the first embodiment of the present invention.

In the image input step 101 shown in FIG. 9, first, two image buffers in which input images are stored are initialized. Next, image input is started. Then, image data are respectively stored in the two image buffers, and if no other pickup image exists, the image pickup process is completed, and the image data are outputted.

Figure 10:
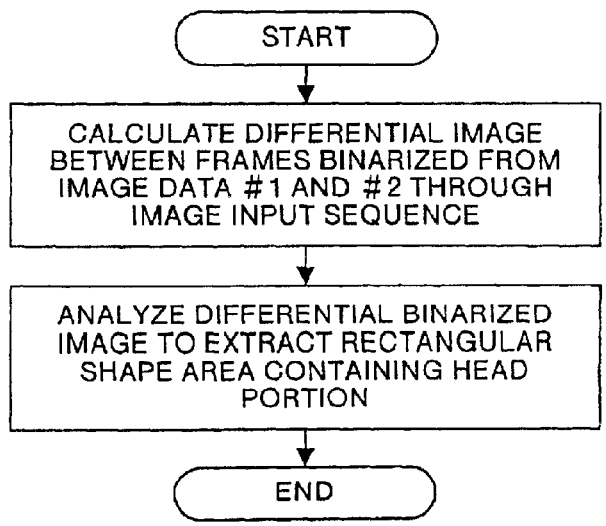
FIG. 10 is a flow chart indicating a head area extracting step in accordance with the first embodiment of the present invention.

In a head area extracting step 102 shown in FIG. 10, first, based upon the image data outputted from the two image buffers, calculations are made to generate a differential image between binarized frames. Next, the differential image between the binarized frames is analyzed to extract a head rectangular shape.

Figure 11:
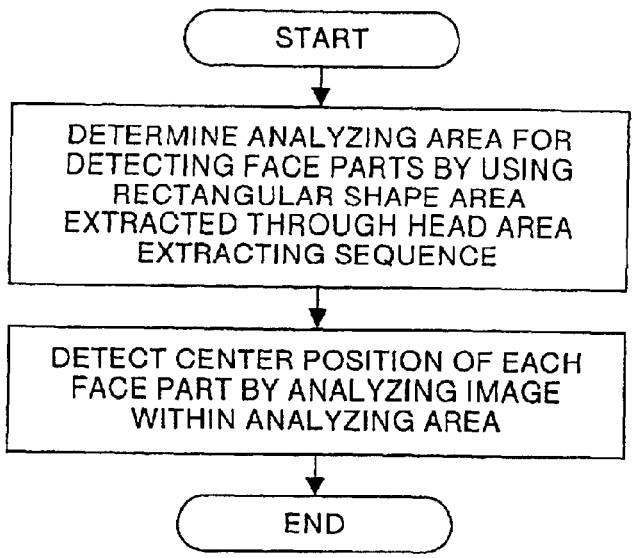
FIG. 11 is a flowchart indicating a feature extracting step in accordance with the first embodiment of the present invention.

In a feature detection step 103 shown in FIG. 11, first, based upon the rectangular area extracted by the head area extracting step 102 and relative positions of the respective face parts with respect to the head shape that have been preliminarily provided, an analyzing range used for detecting a position of each of the face parts is determined. Next, the image within the analyzing range is analyzed for each of the face parts so that the center position of each of the face parts is detected.

Figure 12:
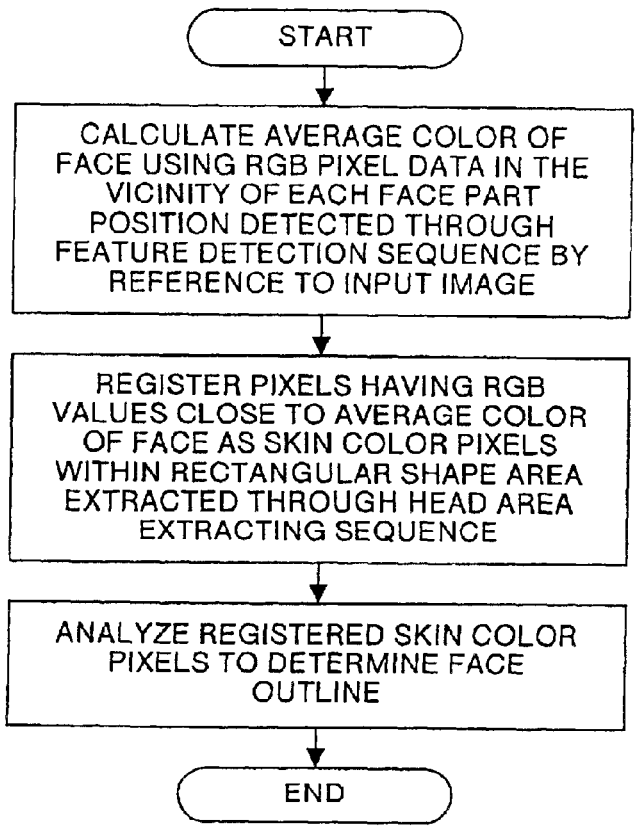
FIG. 12 is a flow chart indicating a face outline determining step in accordance with the first embodiment of the present invention.

In the face outline determining step 104 shown in FIG. 12, first, based upon the image inputted from the image input step 101, the average color of the face is calculated by using RGB pixel data in the vicinity of each of the face part positions detected by the feature detection step 103. Then, within the rectangular area extracted in the head area extracting step 102, pixels having RGB values close to the average color of the face calculated in the first step in a specified range are recorded as skin-color pixels. Next, the skin-color pixels thus recorded are analyzed to determine the face outline.

The above-mentioned image generation calculating method from the picked-up image is realized by an image generation program, and the program is recorded in a recording medium that can be read by a computer, etc., and supplied.

The first embodiment has exemplified the case in which, in the head area extracting section 2, in order to obtain a differential image by using two time-wise consecutive images among input images picked up the image input section 1, the absolute value of the difference of the corresponding pixels is binarized. However, a method other than this, for example, a method in which an image is subjected to a process for extracting the outline of a person, such as an edge analysis, so as to extract the outline including the head and shoulder as described in the first embodiment, may be used, and thereafter, in the same manner as described above, a person's portrait may be generated.

Moreover, the first embodiment has exemplified the case in which, in the head area extracting section 2, a differential image is calculated by using two time-wise consecutive images among input images picked up the image input section 1. However, for example, an image corresponding to one frame picked up by the image input section 1 is used, and supposing that only one person is included in the image and that the background has a uniform color, a new image is formed by shifting this image up and down or right and left by several pixels, and to these two images, the same process as the differential image process of the head area extracting section 2 described in the first embodiment may be applied; thus, it is possible to obtain the same results.

As described above, in the first embodiment, based upon two-dimensional images picked up by the image input section 1, a characteristic feature from the person's face is detected by analyzing the luminance of pixel values, and the person's portrait, etc., that is colored based upon the calculated average color in the vicinity of the characteristic feature is formed, that is, an image emphasizing the characteristic feature of the pickup subject is created. Therefore, without the need of template matching, the characteristic feature of the face parts, etc. are automatically detected, and the skin color, etc. of the face is calculated from the picked-up image. Consequently, it is not necessary to specify the color beforehand, and with respect to the background, in the case of a virtually stationary background, the pickup subject, such as a person, can be detected stably independent of the kinds of the background, with the result that an image in which the characteristic feature of the pick-up subject are emphasized, such as a person's portrait formed by the results of picked-up images, can be generated in a stable manner.

A second embodiment of the present invention will be explained next. The arrangement of a person's portrait generation device in accordance with the second embodiment is the same as that of the first embodiment. In the second embodiment, in addition to the functions explained in the first embodiment, in the image processing section 5, the results of the detection of each of the face parts positions, such as the eyes, the mouth, etc., made by the feature detection section 3 are utilized so as to deform the person's portrait derived from a face image, thereby forming a deformed face image representing emotional changes, such as a smiling face and a crying face.

Figure 14A:
FIG. 14 is an explanatory drawing that shows a specific example for a face portrait image that is formed based upon an input image by an image processing section and a deforming method from the original image, in accordance with the second embodiment of the present invention.
Figure 14B:
Figure 14C:
Figure 14D:
Figure 14E:

FIG. 14A to FIG. 14F are examples that show such deformations of a person's portrait. By utilizing a portrait shown in FIG. 14A (which is the same as the portrait shown in FIG. 7), the person's portrait is deformed based upon the positions of the eyes and mouth, thereby obtaining the results shown in FIG. 14B to FIG. 14F. These are examples of the person's portrait deformations. FIG. 14B shows a smiling face, FIG. 14C shows a crying face, FIG. 14D shows an angry face, FIG. 14E shows a fat face, and FIG. 14F thin face.

Figure 14F:
Figure 14G:
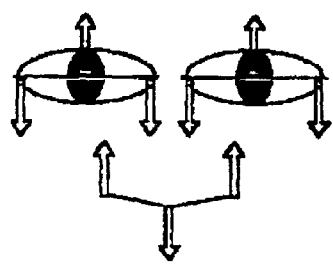
Figure 14H:
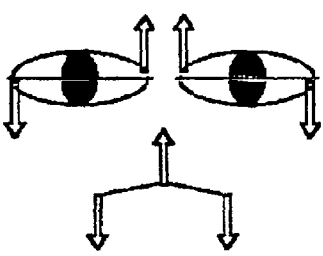
Figure 14I:
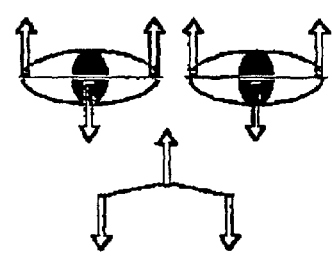
Figure 14J:
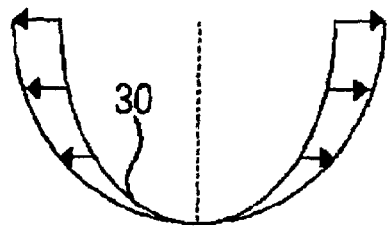
Figure 14K:
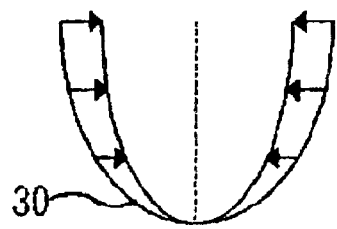

Next, an explanation will be given of specific sequences of the face deformations. First, the face deformations shown in FIG. 14B to FIG. 14D are obtained by deforming a person's portrait image in accordance with directions of arrows determined based upon the positions of the eyes and the position of the mouth shown in FIG. 14G to FIG. 14I respectively. Moreover, the face deformations shown in FIG. 14E and FIG. 14F are obtained by deforming the person's portrait image so as to expand and shrink in the directions of arrows determined based upon the jaw line, as shown in FIG. 14J to FIG. 14K.

As described above, a person's portrait is generated based upon an input image, and it is deformed based upon the detection positions of the face parts, thereby forming the person's portraits representing emotional changes such as a crying face and a smiling face; thus, it becomes possible to automatically generate such images without the necessity of template selection by the user.

Figure 13:
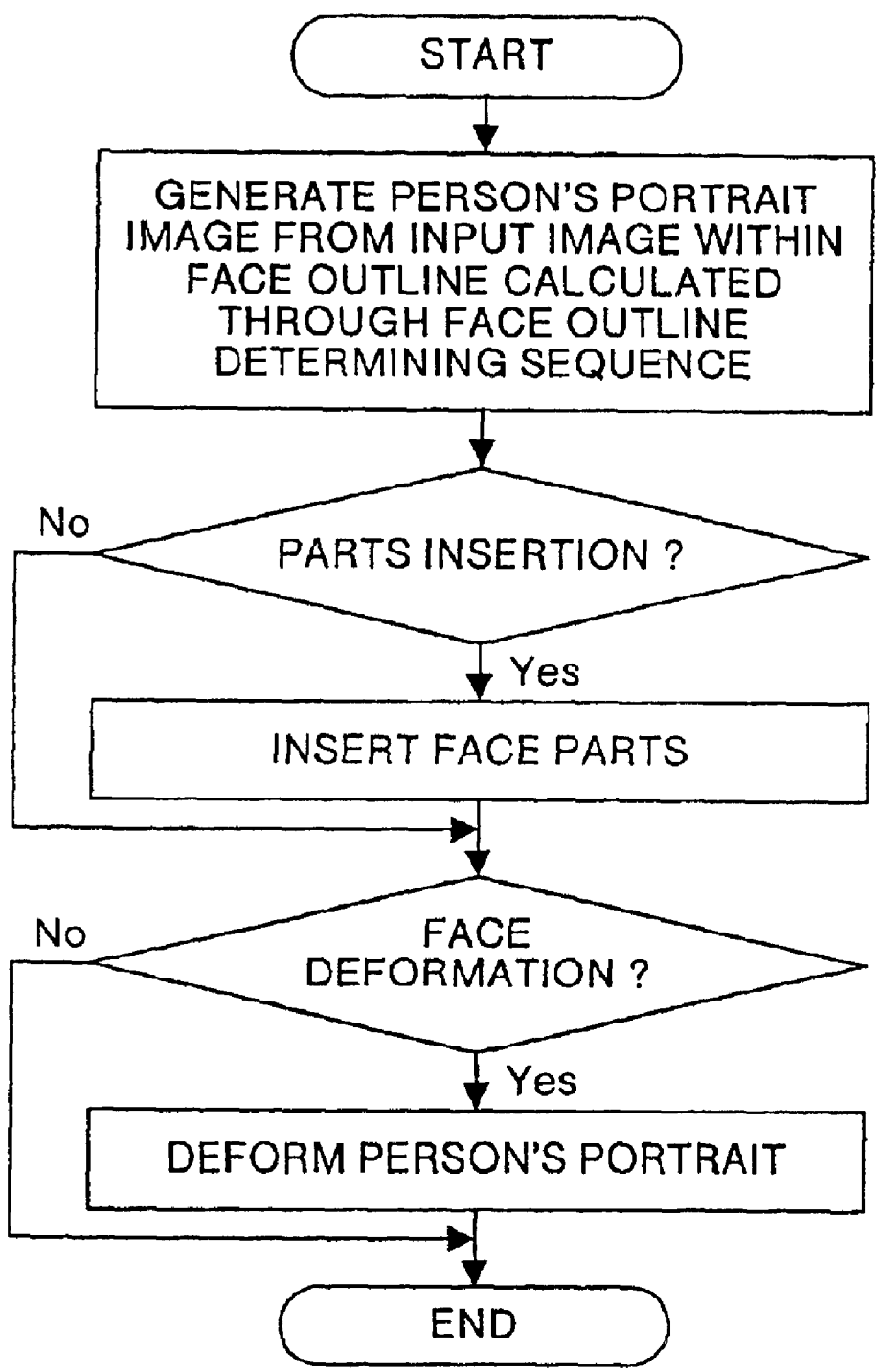
FIG. 13 is a flow chart indicating an image processing step in accordance with the first embodiment of the present invention.

Next, FIG. 13 is a flow chart showing steps in the image processing step 105.

First, based upon an input image within the face outline calculated by the face outline determining step 104, a person's portrait corresponding to FIG. 7 is generated. Next, after discriminations have been made as to whether or not an insertion of any of the face parts is required or whether or not a deformation of any of the face parts is required, a desired person's portrait image is obtained.

The above-mentioned image generation calculating method from the picked-up image is realized by an image generation program, and the program is recorded in a recording medium that can be read by a computer, etc., and supplied.

In the second embodiment, the explanation has been given of the deformations of a person's portrait image by the use of deformations of the face parts. However, for example, the face parts from an original image may be used, and the original image may be partially deformed based upon the detection positions of the face parts so as to provide face deformations representing various emotions. Moreover, in the second embodiment, the explanation has been given of the case in which the deformations are made based upon the positions of the eyes and the position of the mouth. However, characteristic features other than these, for example, the positions of the nose and the ears, may be used as the references on which the deformations are made.

Furthermore, in the second embodiment, with respect to the deforming method for emotional face images, the explanation has been given by reference to FIG. 14G to FIG. 14K. However, the present invention is not intended to be limited by this method, and any known method may of course be used to provide the deformations.

A third embodiment of the present invention will be explained next. The arrangement of a person's portrait generation device in accordance with the third embodiment is the same as that of the first embodiment. In the third embodiment, in addition to the functions explained in the first embodiment, in the image processing section 5, other face parts are put at the face parts positions, such as the eyes, the mouth, etc., detected by the feature detection section 3, in a replacing manner, so as to form another face image different from the person's portrait image shown in the first embodiment.

Figure 15A:
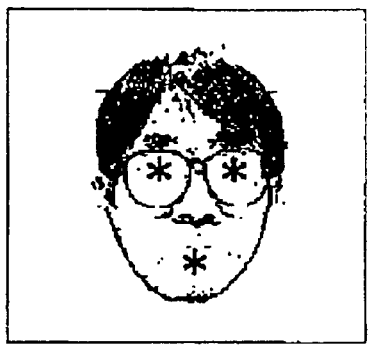
FIG. 15 is an explanatory drawing that shows a specific example for a face portrait image that is formed based upon an input image by an image processing section and a deforming method from the original image, in accordance with the third embodiment of the present invention.
Figure 15B:
Figure 15C:
Figure 15D:
Figure 15E:
Figure 16A:
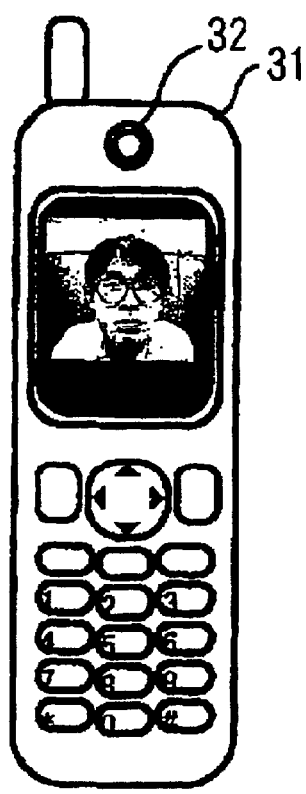
FIG. 16 is an explanatory drawing that shows a communication terminal and a communication method in accordance with the fourth embodiment of the present invention.
Figure 16B:
Figure 16C:
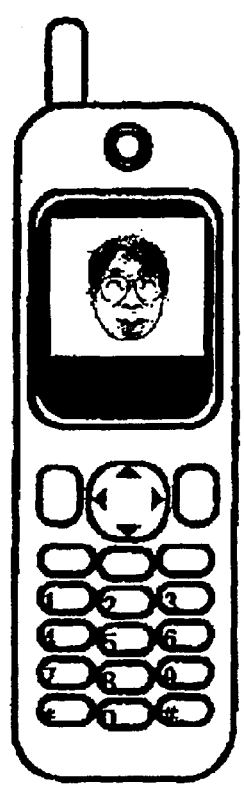
Figure 16D:
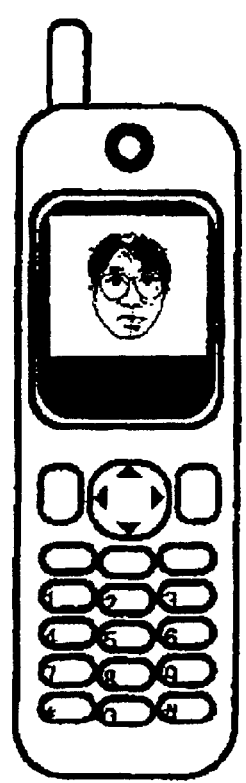

FIG. 15A to FIG. 15E are drawings that explain how already prepared desired face parts are inserted to the positions of the eyes and mouth of the person's portrait image shown in FIG. 7 to form another face image. FIG. 15A shows a case in which asterisk marks are inserted at the positions of the eyes and mouth. Further, when the asterisk mark corresponding to the right eye is replaced with an image of a right eye shown in FIG. 15B, the asterisk mark corresponding to the left eye is replaced with an image of a left eye shown in FIG. 15C, and the asterisk mark corresponding to the mouth is replaced with an image of a mouth shown in FIG. 15D, then the portrait shown in FIG. 15E is obtained.

As described above, in a person's portrait generated from an input image, other face parts images are inserted to the face parts positions automatically detected, thereby forming another face image. Thus, it is possible to omit the user's manually specifying operations related to parts positions, and also to automatically generate various face images by preparing a number of such face parts.

A fourth embodiment of the present invention will be explained next. The fourth embodiment exemplifies a case in which the aforementioned person's portrait generation device or person's portrait generation method is applied to a communication terminal.

FIG. 16 is a drawing that exemplifies a case in which the present invention is applied to a mobile telephone 31 serving as a communication terminal. As shown in FIG. 16A, a face image is picked up by a small-size camera 32 attached to the mobile telephone 31. Then the image is subjected to a face parts position detection and a person's portrait generating process to obtain the person's portrait shown in FIG. 16B. This portrait (data of the portrait) may be then transmitted to a desired destination. On the other hand, the portrait shown in FIG. 16B maybe deformed as shown in FIG. 16C. The portrait maybe deformed to express person's emotions such as cry, smile, anger and joy, or expressing a fat face or a thin face, thereby making it possible to transmit the resulting person's portrait data. Moreover, face parts position information may be detected from the portrait shown in FIG. 16B, and the face parts maybe exchanged with other parts or symbols as shown in FIG. 16D. The portraits shown in FIG. 16C or FIG. 16D may be transmitted to desired destination.

The following description will propose examples of methods for actually using these person's portraits that are effectively used at the time of communication, such as mail exchange. For example, a setting may be made in which, on a waiting screen at the time of mail receiving, the user's portrait is displayed with changes in emotions, such as crying or smiling, depending on the senders; thus, it is possible to immediately judge who sent a mail or what kind of person sent a mail.

In another example of the application, mail senders' portraits are preliminarily registered, and a setting is made so that, upon receipt of a mail, the corresponding sender's portrait is displayed; thus, it is possible to immediately judge who sent the mail. Moreover, even when the receiver is not an acquaintance, sending the sender's portrait may make it possible to provide a friendly mood.

Furthermore, mail subjects may include items such as "sad information" and "good information", and a deformed person's portrait expressing a crying state, smiling state, etc. is provided on the receiver's side; thus, it becomes possible to immediately judge the contents of the mail by the expression of the portrait.

Here, the person's portrait formed by the present invention may be utilized as various indicators for mobile communication apparatuses, etc. For example, a setting may be made so that, when the battery is running out, the user's thin portrait is displayed; thus, it is possible to easily know the exchanging time or charging time for the battery. Moreover, when unread received mails have been accumulated, the receiver's fat face maybe displayed so that it is possible to easily know the degree of accumulated mails. Furthermore, when direct sun light enters the screen, a dazzled face may be displayed thereon so that the corresponding information is easily given.

With respect to other different applications, when a game, etc., is played, upon achievement of a high mark, a smiling face may be displayed while upon receipt of a low mark, a crying face may be displayed; thus, the game becomes more enjoyable. Moreover, the receiver's portrait may be combined with a transmitted person's portrait to have fun. Furthermore, parts such as beard, wigs, etc. may be preliminarily prepared, and these may be combined with a person's portrait to have fun. Furthermore, an angry face may be colored in red, or tear parts, preliminarily prepared separately, may be added to a crying face to have fun.

The above-mentioned communication terminal is not intended to be limited to the mobile telephone, and any communication terminal may be used as long as it can transmit and receive person's portrait images. For example, it can be applied to PDAs (Personal Digital Assistant), notebook PCs, television telephones.

Moreover, in accordance with the person's portrait generation device of the present invention, person's portraits may be attached to electric mails, etc. used in mobile telephones and personal computers. Alternatively in a video conference, etc., using cameras between remote places, instead of showing real images of the participants' faces, the participant's portrait images automatically generated may be given on the screen, and in response to audio data in the discussion, the mouth portions of the portraits may be moved; thus, the participants are allowed to have realistic feelings, while avoiding a feeling of oppression the users might have due to the appearance of their actual face on the screen.

Since the present invention is arranged and has sequences as described above, it provides the following effects:

The person's portrait generation device in accordance with the present invention is provided with the image input section, the head area extracting section, the feature detection section, the face outline determining section and the image processing section; therefore, without the need of template matching, the characteristic features of the face parts, etc. are automatically detected and the skin color, etc. of the face is calculated from the picked-up image so that it is not necessary to specify the color beforehand. Moreover, with respect to the background, in the case of a virtually stationary background, the pickup subject, such as a person, can be detected stably independent of the kinds of the background, with the result that an image in which the characteristic features of the pickup subject are emphasized, such as a person's portrait formed by the results of picked-up images, can be generated in a stable manner.

Moreover, the communication terminal of the present invention is provided with the image input section, the head area extracting section, the feature detection section, the face outline determining section and the image processing section, and the person's portrait thus formed is transmitted and received through the communication unit; therefore, without the need of template matching, the characteristic features of the face parts, etc. are automatically detected and the skin color, etc. of the face is calculated from the picked-up image so that it is not necessary to specify the color beforehand. Moreover, with respect to the background, in the case of a virtually stationary background, the pickup subject, such as a person, can be detected stably independent of the kinds of the background, with the result that an image in which the characteristic features of the pickup subject are emphasized, such as a person's portrait formed by the results of picked-up images, can be generated in a stable manner, and the person's portrait thus formed is utilized so as to inform the user of the transmission and receipt and is also utilized as an indicator for the communication terminal so that it becomes possible to carry out pleasant communications while having fun.

The person's portrait generation method of the present invention is provided with the image input step, the head area extracting step, the feature detection sequence, the face outline determining sequence and the image processing sequence; therefore, without the need of template matching, the characteristic features of the face parts, etc. are automatically detected and the skin color, etc. of the face is calculated from the picked-up image so that it is not necessary to specify the color beforehand. Moreover, with respect to the background, in the case of a virtually stationary background, the pick-up subject, such as a person, can be detected stably independent of the kinds of the background, with the result that an image in which the characteristic features of the pick up subject are emphasized, such as a person's portrait formed by the results of picked-up images, can be generated in a stable manner.

Moreover, the communication method of the present invention is provided with the image input step, the head area extracting step, the feature detection step, the face outline determining step, the image processing step and the step which, upon receipt of information, displays the person's portrait thus formed so as to inform the user of the receipt of the information; therefore, without the need of template matching, the characteristic features of the face parts, etc. are automatically detected and the skin color, etc. of the face is calculated from the picked-up image so that it is not necessary to specify the color beforehand. Moreover, with respect to the background, in the case of a virtually stationary background, the pickup subject, such as a person, can be detected stably independent of the kinds of the background, with the result that an image in which the characteristic features of the pickup subject are emphasized, such as a person's portrait formed by the results of picked-up images, can be generated in a stable manner, and the person's portrait thus formed is utilized so as to inform the user of the transmission and receipt so that it becomes possible to carry out pleasant communications while having fun.

Furthermore, the recording medium of the present invention in which the person's portrait generation program is recorded is provided with: the head area extracting program for extracting a head area of a person from a differential image of a plurality of two-dimensional images picked up by an image input section, the feature detection program for detecting positions of characteristic features of the person's portrait by dividing the head area into face part areas for respective face parts, finding projection data of binarized images for the respective face parts areas and detecting the position of each of the face parts based upon a center-of-gravity position of the projection data, the face outline determining program for determining a border between a face outline and a background within the head area by specifying a skin color area of the two-dimensional image, and the image processing program for creating a person's portrait in which the characteristics in the person's face is emphasized by changing the two-dimensional image with respect to each of the face parts; therefore, the person's portrait thus generated is read by a communication terminal, etc. capable of transmitting and receiving images so that it is utilized so as to inform the user of the transmission and receipt, and is also utilized as an indicator for the communication terminal.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A person's portrait generation device comprising:
   an image input section which picks up two-dimensional images containing a person's face, using an image sensor;
   a head area extracting section which extracts a head area from a differential image of a plurality of the two-dimensional images picked up by the image input section, wherein an outline of the head area is obtained by combining a right-side profile and a left-side profile of the differential image;
   a feature detection section which detects a position of characteristic features of the face within the head area extracted;
   a face outline determining section which determines a border between a face outline and a background within the head area; and
   an image processing section which generates a person's portrait in which the characteristic features of the face are emphasized based upon the two-dimensional image using data acquired by the head area extracting section, the feature detection section, and the face outline determining section.

2. The person's portrait generation device according to claim 1, wherein the outline of the head area is obtained by eliminating noise components of the right-side profile and left-side profile through filtering.

3. The person's portrait generation device according to claim 1, wherein the head area extracting section extracts the head area as a rectangular shape in which a left side, a right side, and an upper side are determined by the outline of the head area and a lower side is determined by a shape ratio constant of an average person's head.

4. A person's portrait generation device comprising:
   an image input section which picks up a two-dimensional image containing a person's face, using an image sensor;
   a head area extracting section which extracts a head area from the image picked up by the image input section;
   a feature detection section which detects a position of characteristic features of the face by dividing the head area extracted into face parts areas for respective face parts and finding projection data of binarized images for the respective face parts areas;
   a face outline determining section which determines a border between a face outline and a background within the head area; and
   an image processing section which generates a person's portrait in which the characteristic features of the face are emphasized based upon the two-dimensional image using data acquired by the head area extracting section, the feature detection section, and the face outline determining section.

5. The person's portrait generation device according to claim 4, wherein the face parts areas are determined by relative positional information of the face parts with respect to the head area.

6. The person's portrait generation device according to claim 4, wherein the position of characteristic features of the face is detected based on a position of a center-of-gravity of the projection data.

7. The person's portrait generation device according to claim 4, wherein the position of characteristic features of the face is detected based on a position of a maximum value of the projection data.

8. A person's portrait generation device comprising:
   an image input section which picks up a two-dimensional image containing a person's face using an image sensor;
   a head area extracting section which extracts a head area from the image picked up by the image input section;
   a feature detection section which detects a position of characteristic features within the head area extracted;
   a face outline determining section which determines a border between a face outline and a background within the head area by specifying a skin color area of the two-dimensional image, wherein, with respect to an average color near the characteristic features of the face, areas having similar colors are used as face area candidates; and
   an image processing section which generates a person's portrait in which the characteristic features of the face are emphasized based upon the two-dimensional image using data acquired by the head area extracting section, the feature detection section, and the face outline determining section.

9. The person's portrait generation device according to claim 8, wherein the face outline determining section determines an outline of a jaw.

10. The person's portrait generation device according to claim 8, wherein, in the face outline determining section, the skin color area is determined by converting an RGB value to an HSV value.

11. A person's portrait generation device comprising:
    an image input section which picks up a two-dimensional image containing a person's face using an image sensor;
    a head area extracting section which extracts a head area from the image picked up by the image input section;
    a feature detection section which detects a position of characteristic features of the face for each of face parts within the head area that has been extracted;

a face outline determining section which determines a
border between a face outline and a background within
the head area; and an image processing section which changes the two-
dimensional image per each face part to generate a
person's portrait in which the characteristic features of
the face are emphasized.

12. The person's portrait generation device according to claim 11, wherein the image processing section changes the two-dimensional image to express the person's emotions by changing a shape of a partial image of each of an eye portion, a nose portion, and a mouth portion that are the characteristic features of the face.

13. The person's portrait generation device according to claim 11, wherein the image processing section replaces partial images of an eye portion, a nose portion, and a mouth portion that are the characteristic features of the face with other partial images.

14. A communication terminal comprising:

an image input section which picks up two-dimensional images containing a person's face using an image sensor;

a head area extracting section which extracts a head area from a differential image of a plurality of the two-dimensional images picked up by the image input section, wherein an outline of the head area is obtained by combining a right-side profile and a left-side profile of the differential image;

a feature detection section which detects a position of characteristic features of the face within the head area extracted;

a face outline determining section which determines a border between a face outline and a background within the head area; and an image processing section which generates a person's portrait in which the characteristic features of the face are emphasized based upon the two-dimensional image, using data acquired by the head area extracting section, the feature detection section, and the face outline determining section, wherein the person's portrait is transmitted and received through a communication unit.

15. The communication terminal according to claim 14, wherein the outline of the head area is obtained by eliminating noise components of the right-side profile and left-side profile through filtering.

16. The communication terminal according to claim 14, wherein the head area extracting section extracts the head area as a rectangular shape in which a left side, a right side, and an upper side are determined by the outline of the head area and a lower side is determined by a shape ratio constant of an average person's head.

17. A communication terminal comprising:

an image input section which picks up a two-dimensional image containing a person's face using an image sensor;

a head area extracting section which extracts a head area from the image picked up by the image input section;

a feature detection section which detects a position of characteristic features of the face by dividing the head area extracted into face parts areas for respective face parts and finding projection data of binarized images for the respective face parts areas;

a face outline determining section which determines a border between a face outline and a background within the head area; and an image processing section which generates a person's portrait in which the characteristic features of the face are emphasized based upon the two-dimensional image using data acquired by the head area extracting section, the feature detection section, and the face outline determining section, wherein the person's portrait is transmitted and received through a communication unit.

18. The communication terminal according to claim 17, wherein the face parts areas are determined by relative positional information of the face parts with respect to the head area.

19. The communication terminal according to claim 17, wherein the position of characteristic features of the face is detected based on a position of a center-of-gravity of the projection data.

20. The communication terminal according to claim 17, wherein the position of characteristic features of the face is detected based on a position of a maximum value of the projection data.

21. A communication terminal comprising:

an image input section which picks up a two-dimensional image containing a person's face using an image sensor;

a head area extracting section which extracts a head area from the image picked up by the image input section;

a feature detection section which detects a position of characteristic features within the head area extracted;

a face outline determining section which determines a border between a face outline and a background within the head area by specifying a skin color area of the two-dimensional image, wherein, with respect to an average color near the characteristic features of the face, areas having similar colors are used as face area candidates; and an image processing section which generates a person's portrait in which the characteristic features of the face are emphasized based upon the two-dimensional image using data acquired by the head area extracting section, the feature detection section, and the face outline determining section, wherein the person's portrait is transmitted and received through a communication unit.

22. The communication terminal according to claim 21, wherein the face outline determining section determines an outline of a jaw.

23. The communication terminal according to claim 21, wherein, in the face outline determining section, the skin color area is determined by converting an RGB value to an HSV value.

24. A communication terminal comprising:

an image input section which picks up a two-dimensional image containing a person's face using an image sensor;

a head area extracting section which extracts a head area from the image picked up by the image input section;

a feature detection section which detects a position of characteristic features of the face for each of face parts within the head area that has been extracted;

a face outline determining section which determines a border between a face outline and a background within the head area; and an image processing section which changes the two-dimensional image per each face part to generate a person's portrait in which the characteristic features of the face are emphasized, wherein the resulting person's portrait is transmitted and received through a communication unit.

25. The communication terminal according to claim 24, wherein the image processing section changes the two-dimensional image to express the person's emotions by changing a shape of a partial image of each of an eye portion, a nose portion, and a mouth portion that are the characteristic features of the face.

26. The communication terminal according to claim 24, wherein the image processing section replaces partial images of an eye portion, a nose portion, and a mouth portion that are the characteristic features of the face with other partial images.

27. A person's portrait generation method comprising:
picking up two-dimensional images containing a person's face using an image sensor;
extracting a head area from a differential image of a plurality of the two-dimensional images picked up, wherein an outline of the head area is obtained by combining a right-side profile and a left-side profile of the differential image;
detecting a position of characteristic features within the head area extracted;
determining a border between a face outline and a background within the head area; and
creating a person's portrait in which the characteristic features of the face are emphasized based upon the two-dimensional image, using output data obtained in extracting the head area, detecting the position of characteristic features, and determining the border.

28. The person's portrait generation method according to claim 27, wherein the outline of the head area is obtained by eliminating noise components of the right-side profile and left-side profile by filtering.

29. The person's portrait generation method according to claim 27, wherein the head area is extracted as a rectangular shape in which a left side, a right side, and an upper side are determined by the outline of the head area, and a lower side is determined by a shape ratio constant of an average person's head.

30. A person's portrait generation method comprising:
picking up a two-dimensional image containing a person's face using an image sensor;
extracting a head area from the image picked up;
detecting a position of characteristic features of the face by dividing the head area extracted into face parts areas for respective face parts and finding projection data of binarized images for the respective face parts areas;
determining a border between a face outline and a background within the head area; and
creating a person's portrait in which the characteristic features of the face are emphasized based upon the two-dimensional image, using data acquired in extracting the head area, detecting the position of the characteristic features and determining the border.

31. The person's portrait generation method according to claim 30, wherein the face parts areas are determined by relative positional information of the face parts with respect to the head area.

32. The person's portrait generation method according to claim 30, wherein the position of characteristic features of the face is detected based on a position of a center-of-gravity of the projection data.

33. The person's portrait generation method according to claim 30, wherein the position of characteristic features of the face is detected based on a position of a maximum value of the projection data.

34. A person's portrait generation method comprising:
picking up a two-dimensional image containing a person's face using an image sensor;
extracting a head area from the image picked up;
detecting a position of characteristic features within the head area extracted;
determining a border between a face outline and a background within the head area by specifying a skin color area of the two-dimensional image, wherein, with respect to an average color in the vicinity of the characteristic features of the face, areas having similar colors are determined as face area candidates; and
creating a person's portrait in which the characteristic features of the face are emphasized based upon the two-dimensional image, using data acquired in extracting the head area, detecting the position of the characteristic features, and determining the border.

35. The person's portrait generation method according to claim 34, wherein, in determining a border, an outline of a jaw is determined.

36. The person's portrait generation method according to claim 34, wherein, in determining the border, the skin color area is determined by converting an RGB value to an HSV value.

37. A person's portrait generation method comprising:
picking up a two-dimensional image containing a person's face using an image sensor;
extracting a head area from the image picked up;
detecting a position of characteristic features of the face for each of the face parts within the head area that has been extracted;
determining a border between a face outline and a background within the head area; and changing the two-dimensional image per each face part to generate a person's portrait in which the characteristic features of the face are emphasized.

38. The person's portrait generation method according to claim 37, wherein, changing a shape of a partial image of each of an eye portion, a nose portion, and a mouth portion that are the characteristic features of the face in treating the person's portrait to express the person's emotions.

39. The person's portrait generation method according to claim 37, wherein, in treating the person's portrait, replacing partial images of an eye portion, a nose portion, and a mouth portion that are the characteristic features of the faces with other partial images.

40. A communication method using a communication terminal comprising:
picking up two-dimensional images containing a person's face using an image sensor;
extracting a head area from a differential image of a plurality of the two-dimensional images picked up, wherein an outline of the head area is obtained by combining a right-side profile and a left-side profile of the differential image;
detecting a position of characteristic features within the head area extracted;
determining a border between a face outline and a background within the head area;
creating a person's portrait in which the characteristic features of the face are emphasized based upon the two-dimensional image, using output data obtained in extracting the head area, detecting a position of characteristic features, and determining the border; and when a communication is received, the person's portrait thus created is displayed so as to inform a user of receipt of the communication.

41. A communication method using a communication terminal comprising:
- picking up a two-dimensional image containing a person's face using an image sensor;
- extracting a head area from the image picked up;
- detecting a position of characteristic features of the face by dividing the head area extracted into face parts areas for respective face parts and finding projection data of binarized images for the respective face parts areas;
- determining a border between a face outline and a background within the head area;
- creating a person's portrait in which the characteristic features of the face are emphasized based upon the two-dimensional image, using data acquired in extracting the head area, detecting the position of the characteristic features, and determining the border; and
- when a communication is received, the person's portrait thus created is displayed so as to inform a user of receipt of the communication.

42. A communication method using a communication terminal that comprises:
- picking up a two-dimensional image containing a person's face using an image sensor;
- extracting a head area from the image picked up;
- detecting a position of characteristic features within the head area extracted;
- determining a border between a face outline and a background within the head area by specifying a skin color area of the two-dimensional image, wherein, with respect to an average color in the vicinity of the characteristic features of the face, areas having similar colors are determined as face area candidates;
- creating a person's portrait in which the characteristic features of the face are emphasized based upon the two-dimensional image, using data acquired in extracting the head area, detecting a position of the characteristic features, and determining the border; and
- when a communication is received, the person's portrait thus created is displayed so as to inform a user of receipt of the communication.

43. A communication method using a communication terminal that comprises:
- picking up a two-dimensional image containing a person's face using an image sensor;
- extracting a head area from the image picked up;
- detecting a position of characteristic features of the face for each of the face parts within the head area that has been extracted;
- determining a border between a face outline and a background within the head area;
- changing the two-dimensional image per each face part to generate a person's portrait in which the characteristic features of the face are emphasized; and
- when a communication is received, the person's portrait thus created is displayed so as to inform a user of receipt of the communication.

44. A recording medium in which is recorded a person's portrait generation program for execution by a computer, and comprising:
- a head area extracting program for extracting a head area of a person from a differential image of a plurality of two-dimensional images picked up by an image input section;
- a feature detection program for detecting positions of characteristic features of the person's portrait by dividing the head area into face parts areas for respective face parts, finding projection data of binarized images for the respective face parts areas and detecting a position of each of the face parts based upon a center-of-gravity position of the projection data;
- a face outline determining program for determining a border between a face outline and a background within the head area by specifying a skin color area of the two-dimensional image; and
- an image processing program for changing the two-dimensional image per each face part of a person's portrait in which the characteristic features in the person's face are emphasized.

* * * * *